United States Patent
Cho (10) Patent No.: US 10,243,504 B2
(45) Date of Patent: Mar. 26, 2019

(54) PHOTOVOLTAIC SYSTEM

(71) Applicant: LSIS CO., LTD., Anyang-si, Gyeonggi-do (KR)

(72) Inventor: Choong Kun Cho, Gunpo-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 203 days.

(21) Appl. No.: 15/003,611

(22) Filed: Jan. 21, 2016

(65) Prior Publication Data

US 2016/0233817 A1   Aug. 11, 2016

(30) Foreign Application Priority Data

Feb. 11, 2015 (KR) .......................... 10-2015-0020929

(51) Int. Cl.
  *G05B 23/02* (2006.01)
  *H02S 10/00* (2014.01)
  *G05B 13/02* (2006.01)

(52) U.S. Cl.
  CPC ............ *H02S 10/00* (2013.01); *G05B 13/026* (2013.01); *G05B 23/0283* (2013.01); *G05B 23/0291* (2013.01)

(58) Field of Classification Search
  CPC ............ G05B 23/0283; G05B 23/0291; G05B 13/026; H02S 10/00
  See application file for complete search history.

(56) References Cited

U.S. PATENT DOCUMENTS

| 9,997,049 B2 * | 6/2018 | Ramaiah | ................... G06N 5/04 |
| 2004/0199833 A1 * | 10/2004 | Brodie | ..................... G01S 5/021 |
| | | | 714/48 |
| 2007/0271023 A1 * | 11/2007 | Morris | ................... F01D 21/003 |
| | | | 701/100 |

(Continued)

FOREIGN PATENT DOCUMENTS

| CN | 102902245 | | 1/2013 |
| CN | 102902245 A | * | 1/2013 |

(Continued)

OTHER PUBLICATIONS

Japan Patent Office Application No. 2016-023281, Office Action dated Jan. 10, 2017, 3 pages.

(Continued)

*Primary Examiner* — Jennifer L Norton
(74) *Attorney, Agent, or Firm* — K&L Gates LLP (57) ABSTRACT

A data collection device for photovoltaic power generation is provided. The data collection device for collecting photovoltaic power generation data includes a reception unit receiving, from a photovoltaic device, generation that absorbed solar energy is converted into electrical energy, and photovoltaic power generation related information; a storage unit storing the photovoltaic power generation related information on the photovoltaic device; a control unit determining a predicted life of the photovoltaic device based on the photovoltaic power generation related information received from the reception unit and accumulated related information stored in the storage unit; and a transceiver transmitting a result of determination to an external device.

9 Claims, 7 Drawing Sheets

(56) References Cited

U.S. PATENT DOCUMENTS

| | | | | |
|---|---|---|---|---|
| 2007/0277613 | A1* | 12/2007 | Iwatsubo | F16C 19/527 73/593 |
| 2008/0140361 | A1* | 6/2008 | Bonissone | G06N 5/04 703/2 |
| 2009/0302879 | A1* | 12/2009 | Kamiya | G01R 31/3016 324/750.3 |
| 2010/0169879 | A1* | 7/2010 | Takeda | G06F 8/60 717/177 |
| 2010/0318233 | A1* | 12/2010 | Yunes | G05B 23/0283 700/287 |
| 2011/0172842 | A1* | 7/2011 | Makhota | H01L 31/02021 700/292 |
| 2014/0132301 | A1 | 5/2014 | Gillispie et al. | |
| 2015/0045970 | A1* | 2/2015 | Anderson | F16K 37/0083 700/282 |
| 2016/0212506 | A1* | 7/2016 | Norwood | H04Q 9/00 |
| 2018/0351789 | A1* | 12/2018 | Ohmae | H04B 17/23 |
| 2018/0356334 | A1* | 12/2018 | Detor | G01B 11/02 |

FOREIGN PATENT DOCUMENTS

| | | | |
|---|---|---|---|
| JP | H04121694 | 4/1992 | |
| JP | 2005202685 | 7/2005 | |
| JP | 2008204142 | 9/2008 | |
| JP | 2009251822 | 10/2009 | |
| JP | 2011-147340 | 7/2011 | |
| JP | 2013191672 | 9/2013 | |
| JP | 5413933 | 2/2014 | |
| JP | 5496933 | 5/2014 | |
| JP | 2014085774 | 5/2014 | |
| JP | 5932603 | 6/2016 | |
| WO | 2011/088028 | 7/2011 | |
| WO | 2011089999 | 7/2011 | |
| WO | 2013136850 | 9/2013 | |
| WO | WO-2018133919 A1 * | 7/2018 | G01M 17/00 |

OTHER PUBLICATIONS

European Patent Office Application Serial No. 16151531.7, Search Report dated Jun. 17, 2016, 8 pages.

State Intellectual Property Office of the People's Republic of China Application Serial No. 201610074375.1, Office Action dated Aug. 2, 2017, 8 pages.

Japan Patent Office Application No. 2016-023281, Office Action dated Sep. 26, 2017, 4 pages.

* cited by examiner

| | 1.PRODUCT USAGE PERIOD, ACCUMULATED GENERATION | 2.FAILURE HISTORY | 3.EXTREME WEATHER | 4.WEATHER INFORMATION | AVERAGE |
|---|---|---|---|---|---|
| FAILURE PROBABILITY AFTER ONE YEAR | 20% | 30% | 30% | 20% | 25% |
| FAILURE PROBABILITY AFTER TWO YEARS | 40% | 50% | 60% | 30% | 45% |
| FAILURE PROBABILITY AFTER THREE YEARS | 70% | 70% | 90% | 90% | 80% |
| FAILURE PROBABILITY AFTER FOUR YEARS | 50% | 50% | 40% | 50% | 48% |
| FAILURE PROBABILITY AFTER FIVE YEARS | 40% | 20% | 50% | 40% | 38% |

FIG. 7B

PHOTOVOLTAIC SYSTEM

CROSS-REFERENCE TO RELATED APPLICATIONS

Pursuant to 35 U.S.C. § 119(a), this application claims the benefit of earlier filing date and right of priority to Korean Patent Application No. 10-2015-0020929, filed on Feb. 11, 2015 the contents of which are hereby incorporated by reference herein in its entirety.

BACKGROUND

The present disclosure relates to a photovoltaic system, and more particularly to, a data collection device that predicts the life of a photovoltaic device and notifies an inspection cycle.

Due to worries about the exhaustion of fossil energy, such as oil and environmental pollution, interest in alternative energy increases. Among others, photovoltaic power generation that uses solar energy to produce electricity on a large scale by spreading, on a large scale, panels to which solar batteries are attached. The photovoltaic power generation has advantages in that there is no need to consume fuel costs and there is no air pollution or waste, because it uses unlimited, pollution-free solar energy.

A solar energy power generation style includes an independent style and a system-associated style. In the system-associated style, a photovoltaic device is connected to a typical power system. When a photovoltaic system generates electricity in daytime, it transmits power and at night or when it rains, the photovoltaic power generation system receives electricity from a system. In order to efficiently use the system-associated photovoltaic system, a photovoltaic system has been introduced which stores idle power in a battery energy storage system (BESS) under a light load, and discharges the BESS to supply discharged power as well as photovoltaic power to the system under a heavy load.

SUMMARY

Embodiments apply accumulated failure data to predict the life of a product based on use history information on a photovoltaic device. Embodiments also provide a photovoltaic system that notifies an inspection cycle for the photovoltaic device or recommends replacement according to a prediction result.

In one embodiment, a data collection device for collecting photovoltaic power generation data includes a reception unit receiving, from a photovoltaic device, generation that absorbed solar energy is converted into electrical energy, and photovoltaic power generation related information; a storage unit storing the photovoltaic power generation related information on the photovoltaic device; a control unit determining a predicted life of the photovoltaic device based on the photovoltaic power generation related information received from the reception unit and accumulated related information stored in the storage unit; and a transceiver transmitting a result of determination to an external device.

The photovoltaic power generation related information may include at least one of a use period, failure history, accumulated generation, weather information, and installation position of the photovoltaic device.

The control unit determines a failure probability at regular intervals based on the photovoltaic power generation related information and determines, as a predicted life, a period in which the determined failure probability is highest.

The reception unit may receive, from the external device, a generation control signal and inspection cycle information for the photovoltaic device.

The control unit may transmit, to the photovoltaic device and the external device, a control signal to stop an operation of the photovoltaic device based on the determined predicted life.

The data collection device may further include a display unit that displays a response received from the external device.

In another embodiment, a photovoltaic system using solar energy includes a photovoltaic device absorbing and converting solar energy into electrical energy; and a data collection device receiving, from the photovoltaic device, photovoltaic power generation and photovoltaic power generation related information, storing the photovoltaic power generation related information on the photovoltaic device, and determining a predicted life of the photovoltaic device based on the photovoltaic power generation related information received from a reception unit and accumulated related information stored in the storage unit.

The photovoltaic system may further include an external device that transmits, to the data collection device, a generation control signal and inspection cycle information for the photovoltaic device based on the predicted life of the photovoltaic device that is received from the data collection device.

The external device may transmit a control signal to lower generation to the data collection device when the predicted life is shorter than an average life of the photovoltaic device of a same model.

The data collection device may transmit, to the photovoltaic device and the external device, a control signal to stop an operation of the photovoltaic device based on the determined predicted life.

The data collection device may output a response received from the external device.

The details of one or more embodiments are set forth in the accompanying drawings and the description below. Other features will be apparent from the description and drawings, and from the claims.

DETAILED DESCRIPTION OF THE EMBODIMENTS

Embodiments are described below in detail with reference to the accompanying drawings so that a person skilled in the art may easily practice the embodiments. However, the present disclosure may be implemented in many different forms and is not limited to embodiments that are described herein. In addition, parts irrelevant to descriptions are not provided in the drawings in order to make the present disclosure clear and similar parts throughout the disclosure have similar reference numerals.

Also, when it is described that a part includes some components, it should be understood that it may not exclude but further include other components if there is no specific objection.

In the following, a system-associated photovoltaic device according to an embodiment is described with reference to FIGS. 1 to 3.

Figure 1:
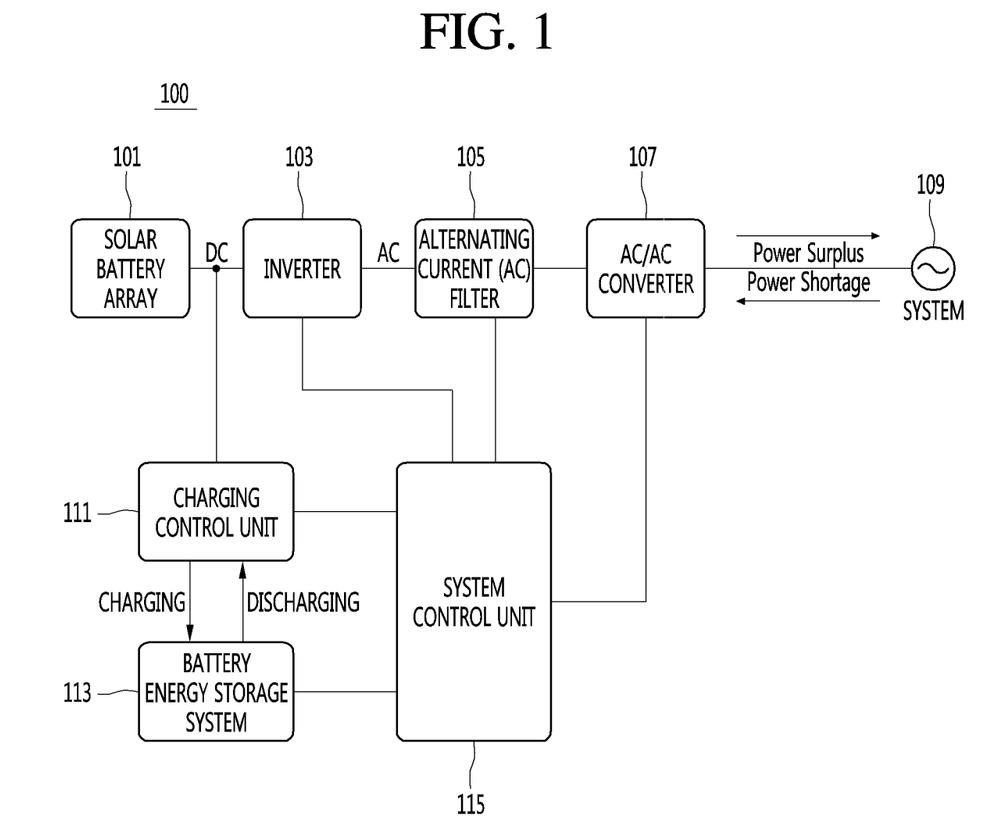
FIG. 1 is a block diagram of a system-associated photovoltaic device according to an embodiment.

FIG. 1 is a block diagram of a system-associated photovoltaic device according to an embodiment.

A system-associated photovoltaic device 100 according to an embodiment includes a solar battery array 101, an inverter 103, an alternating current (AC) filter 105, an AC/AC converter 107, a system 109, a charging control unit 111, a battery energy storage system 113, and a system control unit 115.

The solar battery array 101 is obtained by coupling a plurality of solar battery modules. The solar battery module is a device in which a plurality of solar batteries is connected in series or parallel to convert solar energy into electrical energy to generate a certain voltage and current. Thus, the solar battery array 101 absorbs solar energy to convert it into electrical energy.

The inverter 103 inverts direct current (DC) power into AC power. It receives the DC power supplied by the solar battery array 101 or the DC power discharged by the battery energy storage system 113 through the charging control unit 111 to invert them into AC power.

The AC filter 105 filters the noise of power inverted into the AC power.

The AC/AC converter 107 converts the size of a voltage of the AC power devoid of noise, and supplies the converted power to the system 109.

The system 109 is a system that incorporates many power stations, substations, power transmission and distribution cables, and loads to generate and use power.

The charging control unit 111 controls the charging and discharging of the battery energy storage system 113. When the system is a heavy load, the charging control unit 111 receives power from the battery energy storage system 113 and delivers it to the system. When the system is a light load, the charging control unit 111 receives power from the solar battery array 101 and delivers it to the battery energy storage system 113.

The battery energy storage system 113 receives electrical energy from the solar battery array 101 for charging and discharges the charged electrical energy according to the power supply and demand condition of the system 109. In particular, in the case that the system 109 is a light load, the battery energy storage system 113 receives idle power from the solar battery array 101 for charging. When the system 109 is a heavy load, the battery energy storage system 113 discharges charged power to supply power to the system 109. The power supply and demand condition of the system has a big difference according to the time zone. Thus, it is inefficient that the system-associated photovoltaic device 100 uniformly supplies the power supplied by the solar battery array 101 without consideration of the power supply and demand condition of the system 109. Therefore, the system-associated photovoltaic device 100 uses the battery energy storage system 113 to adjust an amount of power supply according to the power supply and demand of the system 109. Accordingly, the system-associated photovoltaic device 100 may efficiently supply power to the system 109.

The system control unit 115 controls the operations of the charging control unit 111, the inverter 103, the AC filter 105, and the AC/AC converter 107.

Figure 2:
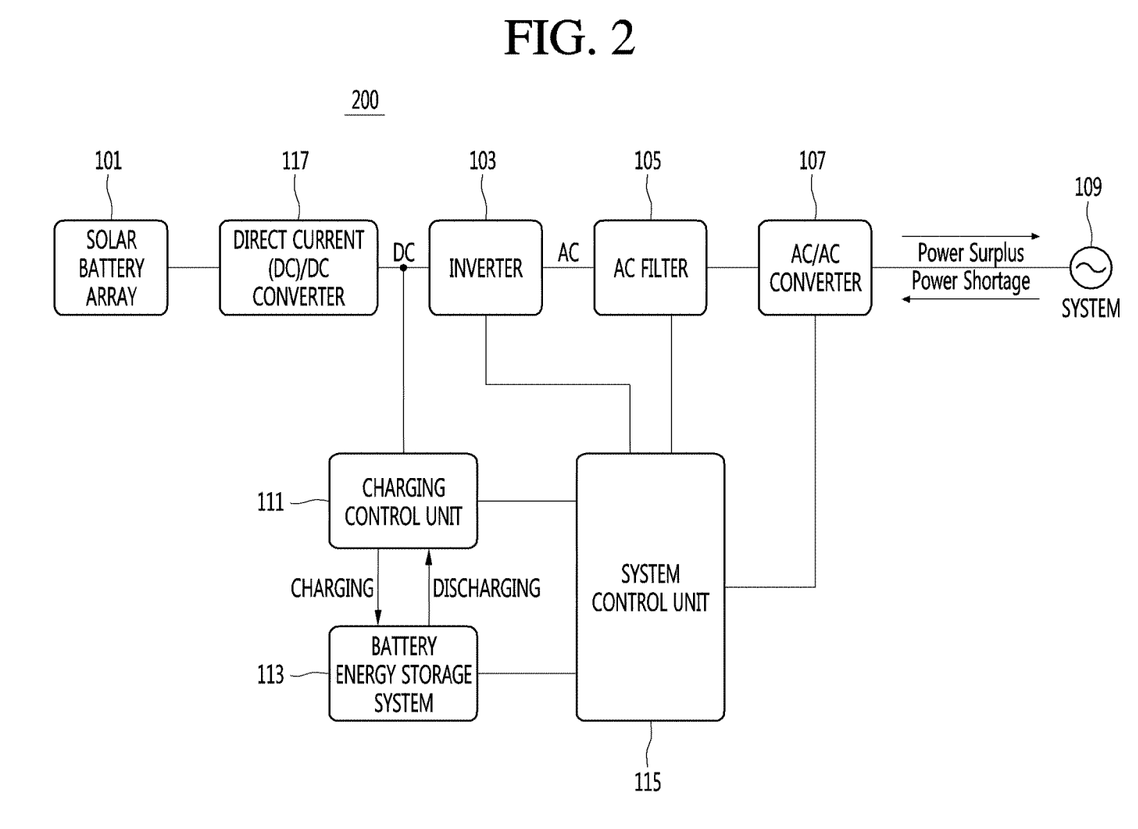
FIG. 2 is a block diagram of a small-scale system-associated photovoltaic device according to an embodiment.

FIG. 2 is a block diagram of a small-capacity system-associated photovoltaic device according to an embodiment.

A small-capacity system-associated photovoltaic device 200 according to an embodiment includes a solar battery array 101, an inverter 103, an AC filter 105, an AC/AC converter 107, a system 109, a charging control unit 111, a battery energy storage system 113, a system control unit 115, and a DC/DC converter 117.

The present embodiment is the same as the embodiment in FIG. 1 but further includes the DC/DC converter 117. The DC/DC converter 117 converts the voltage of DC power generated by the solar battery array 101. The voltage of power produced by the solar battery array 101 in the small-capacity system-associated photovoltaic device 200 is low. Thus, there is a need to boost the voltage in order to input power supplied by the solar battery array 101 to the inverter. The DC/DC converter 117 converts the voltage of power produced by the solar battery array 101 into a voltage that may be input to the inverter 103.

Figure 3:
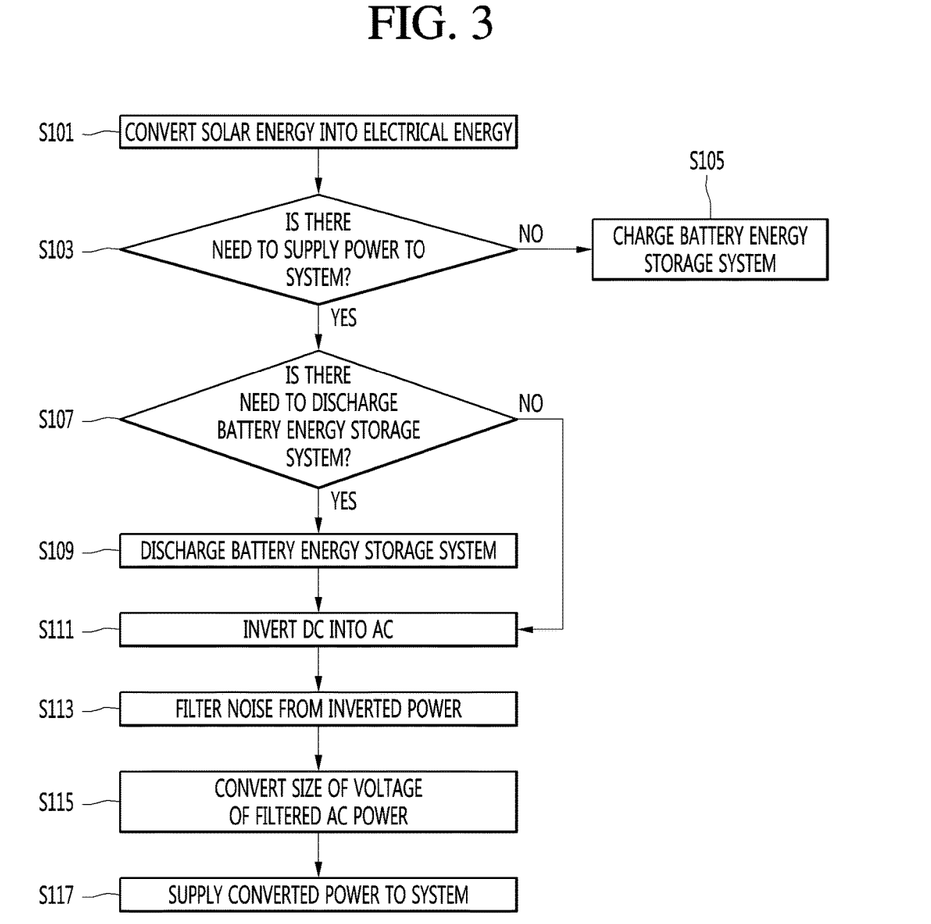
FIG. 3 is a flowchart of the operation of a system-associated photovoltaic device according to an embodiment.

FIG. 3 is a flowchart of the operation of a system-associated photovoltaic device according to an embodiment.

The solar battery array 101 converts solar energy into electrical energy in step S101.

The system control unit 115 determines whether there is a need to supply power to the system 109, in step S103. Whether there is a need to supply power to the system 109 may be determined based on whether the system 109 is a heavy load or light load.

When there is no need to supply power to the system 109, the system control unit 115 controls the charging control unit 111 to charge the battery energy storage system 113, in step S105. In particular, the system control unit 115 may generate a control signal that controls the charging control unit 111. The charging control unit 111 may receive the control signal to charge the battery energy storage system 113.

The system control unit 115 determines whether there is a need to discharge the battery energy storage system 113, in step S107. It is possible to determine whether there is a need to discharge the battery energy storage system 113 because electrical energy supplied by the solar battery array 101 fails to satisfy the power demand of the system 109. Also, the system control unit 115 may determine whether the battery energy storage system 113 stores sufficient electrical energy to be discharged.

When there is a need to discharge the battery energy storage system 113, the system control unit 115 controls the charging control unit 111 to discharge the battery energy storage system 113, in step S109. In particular, the system control unit 115 may generate a control signal that controls the charging control unit 111. The charging control unit 111 may receive the control signal to discharge the battery energy storage system 113.

The inverter 103 inverts electrical energy discharged by the battery energy storage system 113 and electrical energy converted by the solar battery array 101 into AC, in step S111. In this case, the system-associated photovoltaic device 100 inverts both the electrical energy discharged by the battery energy storage system 113 and the electrical energy converted by the solar battery array 101 through a single inverter 103. Each electric appliance has a limit in consumption power. The limit includes an instantaneous limit and a long-term limit, and maximum power that may be used without damage to a device for a long time is defined as rated power. In order to maximize the efficiency of the inverter 103, there is a need to supply power so that the battery energy storage system 113 and the solar battery array 101 use power corresponding to 40% to 60% of the rated power.

The AC filter 105 filters the noise of inverted power, in step S113.

The AC/AC converter 107 converts the size of a voltage of the filtered AC power to supply the converted power to the system 109, in step S115.

The system-associated photovoltaic device 100 supplies converted power to the system in step S117.

Since the system-associated photovoltaic device 100 according to the embodiments in FIGS. 1 to 3 uses only a single inverter 103, there are following limitations when the rated power of the inverter 103 is determined based on the capacity of the solar battery array 101 in order to design the system-associated photovoltaic device 100. When the battery energy storage system 113 discharges electricity and thus supplies electrical energy along with the solar battery array 101, it is difficult to maximize the efficiency of the inverter 103 because the inverter 103 uses power exceeding 40% to 60% of the rated power. Alternatively, when the battery energy storage system 113 discharges electricity and thus supplies electrical energy solely, it is difficult to maximize the efficiency of the inverter 103 because the inverter 103 uses power less than 40% to 60% of the rated power. Besides, when the battery energy storage system 101 supplies a little amount of electrical energy, it is difficult to maximize the efficiency of the inverter 103 because the inverter 103 uses power less than 40% to 60% of the rated power. In this case, the efficiency with which the system-associated photovoltaic device 100 converts solar energy into electrical energy decreases. Also, since the total harmonic distortion (THD) of power increases, the quality of power that the system-associated photovoltaic device 100 produces goes down.

Figure 4:
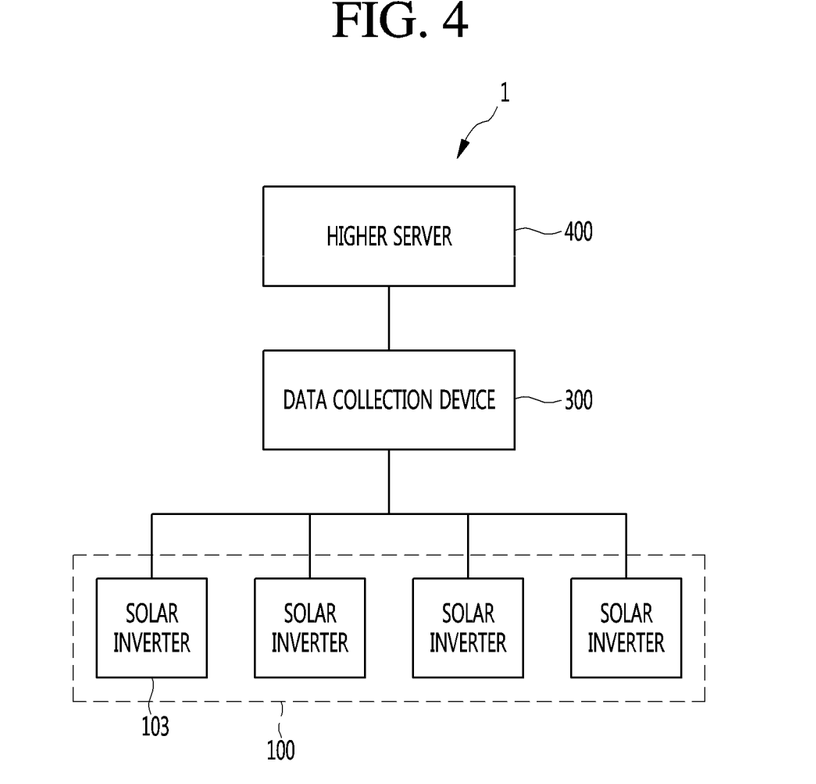
FIG. 4 is a block diagram that represents the configuration of a photovoltaic system.

FIG. 4 is a block diagram that represents the configuration of the photovoltaic system 1.

Referring to FIG. 4, a solar inverter 103 may be included in the photovoltaic device 100. Since the solar inverter 103 has been described above in detail, related descriptions are omitted in FIG. 4. The solar inverter 103 may exist in singularity or in plurality in the photovoltaic device 100. The photovoltaic inverter 103 may deliver an amount of photovoltaic power generation to a data collection device 300.

Various sensors of the photovoltaic device 100 may deliver sensed data along with the amount of photovoltaic power generation to the data collection device 300. In an embodiment, the sensed data may include at least one of sunshine, temperature, sunrise/sunset time, and a weather condition. The photovoltaic device may deliver power generation time information along with the above-described data to the data collection device 300.

The data collection device 300 receives and synthesizes data from the lower inverter 103 and the photovoltaic device 100. The data collection device 300 may be a component in the photovoltaic device 100 or may be a separate component that is connected to a plurality of photovoltaic devices 100. The data collection device 300 may provide the collected power generation information to users or clients for monitoring. Also, when there is a higher server 400 connected to the plurality of data collection devices 300, it is possible to deliver the collected power generation information to the higher server 400.

In the following, the data collection device 300 is described in detail with reference to FIG. 5.

Figure 5:
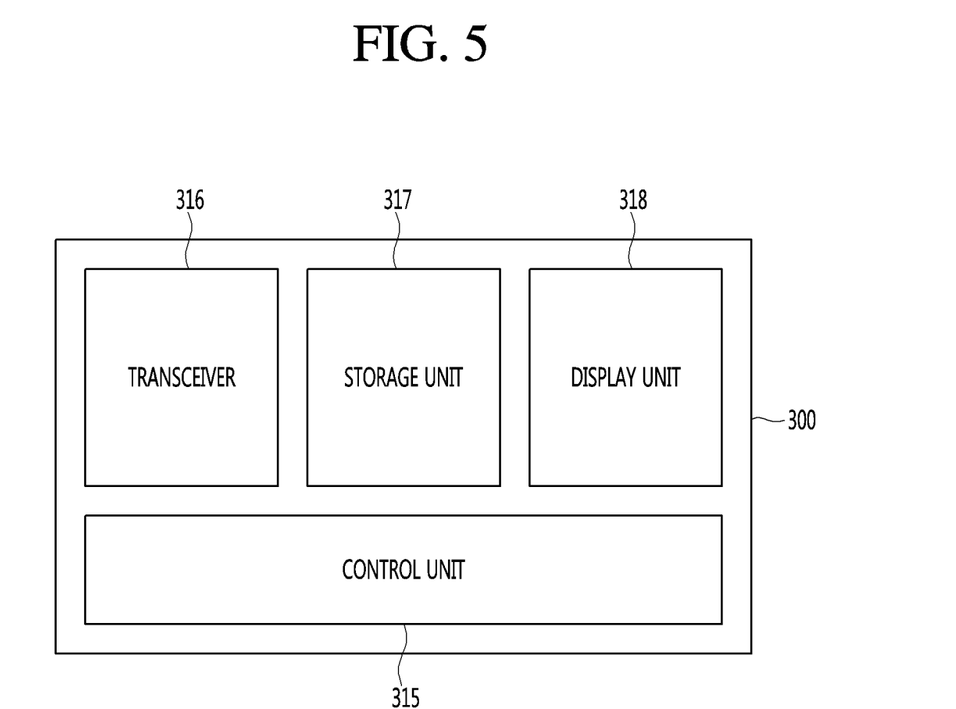
FIG. 5 is a block diagram that represents the configuration of a data collection device.

The data collection device 300 may include a control unit 315, a transceiver 316, a storage unit 317, and a display unit 318, as shown in FIG. 5. However, the embodiment is not limited to components in FIG. 5 and may further include other components as needed.

The transceiver 316 receives photovoltaic related data from the photovoltaic device 100 that includes the inverter 103 and various sensors (not shown). A reception method may include both wired and wireless communication methods. When the data collection device 300 is a component in the photovoltaic device 100, it is possible to receive data through a circuit that is connected to between internal components.

Also, the transceiver 316 may transmit the collected photovoltaic power generation data to the higher server 400. Likewise, it is possible to transmit the data to the higher server 400 through wired/wireless communication.

Also, the transceiver 316 may transmit the amount of photovoltaic power generation to users and clients. In particular, it is possible to transmit information for monitoring the amount of power generation to the owner of the photovoltaic device 100 or to an electricity dealer.

Also, the transceiver 316 may also be divided into a transceiver and a receiver.

The storage unit 317 stores collected power generation data. Photovoltaic power generation is performed everyday, and the data collected by the data collection device 300 is stored in the storage unit 317 for the time being and transmitted to another place. The data stored in the storage unit 317 may be utilized for decreasing transmission data to be described below.

The display unit 318 may display data for monitoring the amount of photovoltaic power generation. The display unit may include a display that visually displays data, and a speaker that auditorily outputs data.

The control unit 315 controls the operations of the above-described transceiver 316, storage unit 317, and display unit 318. Furthermore, the control unit 315 may process the received data to generate difference data. How to process the data is described below in detail.

Figure 6:
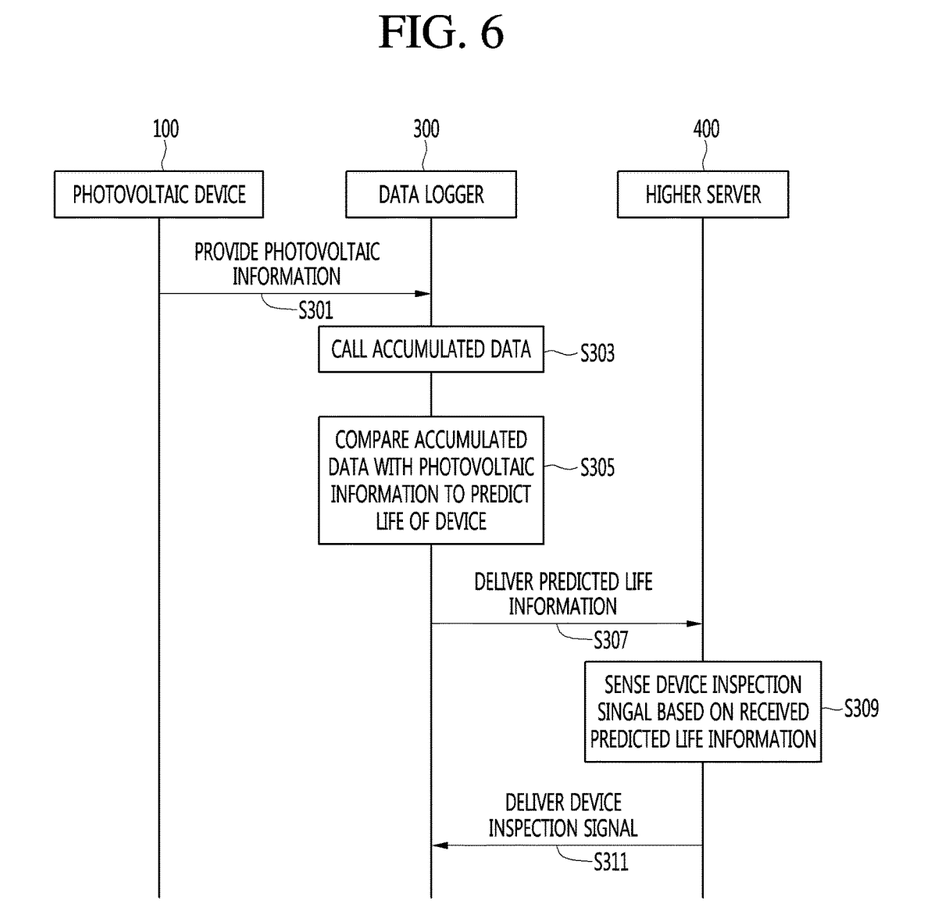
FIG. 6 is a flow chart of a failure inspection method of a photovoltaic system according to an embodiment.

FIG. 6 is a flow chart of a failure inspection method of a photovoltaic system according to an embodiment.

The photovoltaic device 100 transmits photovoltaic power generation information to the data collection device 300 in step S301. In particular, an amount of photovoltaic power generation collected by the solar inverter 103 in the photovoltaic device 100 and other power generation information collected by various sensors are transmitted to the data collection device 300.

In an embodiment, the collected power generation information may include the use period of a corresponding photovoltaic device, generation information, and the failure history of the corresponding photovoltaic device until now.

In another embodiment, the collected power generation information may include whether weather is extreme and weather information. In this case, the weather information may include e.g., temperature, humidity, and information on the region in which the corresponding photovoltaic device is installed.

The information delivered to the data collection device 300 may also be information collected by the photovoltaic device 100 or information input upon the initial installation of the device. For example, the information on the region in which the photovoltaic device 100 is installed may be data input upon upon the installation of the photovoltaic device.

When the transceiver 316 of the data collection device 300 receives power generation information from the photovoltaic device, the control unit 315 of the data collection device calls accumulated date related to a corresponding photovoltaic device from the storage unit 317 in step S303. Use data on the same device as the photovoltaic device that provides power generation information and a photovoltaic device of a different model is stored in the storage unit 317 of the data collection device 300. Thus, the control unit 315 calls related data from the storage unit 317 in order to compare the past use details of the same device with the currently received data.

The data stored in the storage unit 317 may include the average life and normal generation of corresponding photovoltaic devices, state data on a photovoltaic device that has experienced an exceptional situation, or the like. The exceptional situation may include a case where the photovoltaic device has met typhoon or heavy rain, for example.

The control unit 315 compares the data received from the photovoltaic device 100 with the data called from the storage unit 317 to predict the life of the corresponding photovoltaic device 100 in step S305. In particular, it compares data on the current photovoltaic device 100 with accumulated data on the photovoltaic device 100 of the same model to predict life.

In an embodiment, the control unit 315 may predict the life from the use period of the photovoltaic device 100. For example, in the case that data accumulated with respect to the average life of the same model as the corresponding device indicates 10 years and the use period received from the photovoltaic device 100 is 9 years, the control unit 315 may determine that the photovoltaic device 100 has a limited life.

As another example, in the case that there is no problem in use period but the received generation data is 100 and the average generation data of the same model as a corresponding photovoltaic device is 200, it is possible to predict that the corresponding photovoltaic device has a limited life, because the corresponding photovoltaic device 100 has a problem.

As another example, in the case that data that the number of times that the corresponding photovoltaic device 100 has been inspected in recent years due to failure is equal to or larger than a specific number is received, the control unit 315 may predict the life of a device from average life data when the device of the same model stored in the storage unit 317 is inspected a corresponding number of times.

As another example, in the case that the corresponding photovoltaic device 100 meets extreme weather (e.g., typhoon, heavy rain), the control unit 315 may predict the life of the photovoltaic device 100 from average life data when the device of the same model stored in the storage unit 317 meets the received extreme weather. In particular, in the case that there is accumulated data that when the photovoltaic device suffers flooding damage due to heavy rain, almost all of photovoltaic devices need inspection and when the inspection is not performed, their operations stop within six months, it is possible to predict the remaining life and state of the corresponding photovoltaic device 100 as in the accumulated data.

As another example, in the case that data that the temperature of a region where the corresponding photovoltaic device 100 is installed is equal to or higher than a specific number, the control unit 315 may predict the life of the corresponding photovoltaic device 100 from the average life of photovoltaic devices installed at the specific number from the storage unit.

Figure 7A:
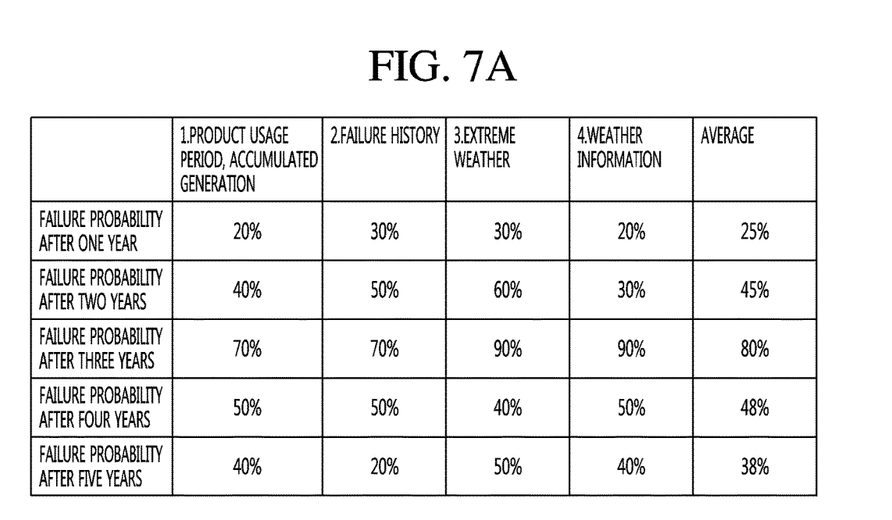
FIGS. 7a and 7b are diagrams that represent an embodiment predicting the life of a product from factors that predict the life of the product.
Figure 7B:
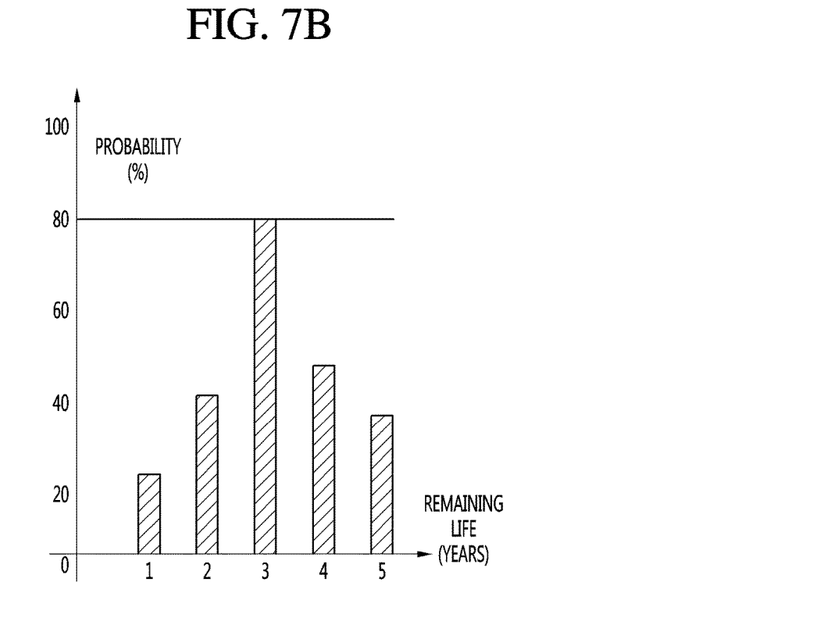

The control unit 315 may together consider factors that may predict the above-described device life, to predict the life of a product. Corresponding content is described below in more detail with reference to FIG. 7.

FIGS. 7a and 7b are diagrams that represent an embodiment predicting the life of a product from factors that predict the life of the product.

Referring to FIG. 7a, a product use period, a failure history, extreme weather, and weather information are represented on the horizontal axis of a table as a criterion for predicting the life of a device, and a failure probability by criterion is represented on the vertical axis of the table. Specifically, if the product use period or accumulated generation data has a difference equal to or larger than a specific value from normal data or approaches an average failure period, a probability that a corresponding photovoltaic device fails after one year is 20%, a probability that a corresponding photovoltaic device fails after two years is 70%, and a probability that a corresponding photovoltaic device fails after three years is 70%. Thus, when only the product use period or accumulated generation is considered, it may be predicted that a corresponding device is most likely to fail after three years and thus the control unit 315 may determine that the remaining life is three years.

According to the content of the table in FIG. 7a, when four factors are considered, it is possible to see that a probability that the corresponding photovoltaic device 100 fails after one year is 25%, a probability that the corresponding photovoltaic device fails after two years is 45%, a probability that the corresponding photovoltaic device fails after three years is 80%, a probability that the corresponding photovoltaic device fails after four years is 48%, and a probability that the corresponding photovoltaic device fails after five years is 38%. Thus, a corresponding graph is shown in FIG. 7b and the control unit 315 may determine based on data received from the corresponding photovoltaic device that the predicted life is three years.

In other words, the control unit 315 may determine the failure probability of a photovoltaic device at regular intervals based on additional information on photovoltaic power generation and it is possible to determine, as the predicted life, a period in which the determined failure probability is the highest. In this case, the regular interval may be one year. Also, a user may arbitrarily determine the regular interval.

In addition, since the probability that the device fails after three years is the highest, the control unit 315 may also determine that the corresponding photovoltaic device 100 needs regular inspection within three years.

Also, the control unit 315 may assign weight to factors predicting the life of the photovoltaic device 100 to enhance the accuracy of life prediction. In the case that e.g., accumulated data is referenced and the control unit 315 determines that life prediction based on a failure history is most accurate, it is possible to determine that the corresponding photovoltaic device has a limited life, though other data excluding data on the failure history is normal.

Also, in the case that the control unit 315 predicts the life of the photovoltaic device 100 and determines that it is difficult to operate the corresponding photovoltaic device 100 longer, it is also possible to transmit a control signal to store the operation of the device to the photovoltaic device 100. In this case, the control unit 315 may notify a higher server that a corresponding control signal has been transmitted.

The data collection device 300 delivers predicted life information and photovoltaic power generation data to the higher server 400 through the transceiver 316 in step S307.

The data collection device 300 may transmit the data to the higher server 400 by using both wired and wireless communication.

The higher server 400 synthesizes the predicted life information and related generation information received from the data collection device 300 to generate a device inspection signal in step S309. In an embodiment, the device inspection signal may be information on a cycle in which a corresponding photovoltaic device is inspected. In another embodiment, the device inspection signal may be a control signal that lowers generation based on life information on a corresponding photovoltaic device. In particular, in the case that the predicted life is lower than the average life of a photovoltaic device of the same model, the higher server 400 may generate a control signal that lowers generation.

In another embodiment, the device inspection signal may also include content that changes the installation position of a corresponding photovoltaic device. In another embodiment, it is also possible to generate message content that prepares for the photovoltaic device 100 based on weather information.

The data collection device 300 receives control signals transmitted by the higher server 400 in step S311. In particular, the data collection device 300 may receive control signals from the higher server 400 through the receiver 316. Additionally, the data collection device 300 may also perform, through the control unit 315, an operation corresponding to the control signal received from the higher server 400, and may also notify an administrator of message content when corresponding message content is received.

It is possible to predict the life of a photovoltaic device based on photovoltaic power generation data and prepare before serious failure occurs.

Also, by preparation, it is possible to minimize a photovoltaic power generation vacuum due to large-scale device failure.

Also, even when an administrator does not regularly inspect the photovoltaic device, it is possible to predict the state of the device and thus it is easy to manage the device.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the present disclosure. A person skilled in the art may appreciate that many variations and applications not presented above may be implemented without departing from the essential characteristic of embodiments. For example, each component particularly represented in embodiments may vary. In addition, it should be construed that differences related to such a variation and such an application are included in the scope of the present disclosure defined in the following claims.

What is claimed is:

1. A data collection device for collecting photovoltaic power generation data from a photovoltaic device, the data collection device comprising:
   a storage configured to store accumulated related information related to the photovoltaic device;
   a reception unit receiving, from the photovoltaic device, generation data regarding electrical energy converted from absorbed solar energy, and photovoltaic power generation related information;
   a control unit determining a predicted life of the photovoltaic device based on the photovoltaic power generation related information received from the reception unit and the accumulated related information; and
   a transceiver configured to transmit a result of the determination to an external device,
   wherein the photovoltaic power generation related information comprises at least one of a use period, failure history, accumulated generation, weather information, and installation position of the photovoltaic device, and the accumulated related information comprises at least one of a use period, failure history, accumulated generation, weather information, and installation position of a different photovoltaic device corresponding to the photovoltaic device,
   wherein the control unit further:
      compares at least one of the use period, failure history, accumulated generation, and weather information that are received through the reception unit, with at least one of the use period, failure history, accumulated generation, and weather information that are stored in the storage;
      calculates a failure probability of the photovoltaic device for each of a plurality of periods based on a result of the comparison;
      determines the predicted life by:
         considering the predicted life of the photovoltaic device as a failure probability of the photovoltaic device calculated with regard to one of the use period, failure history, accumulated generation, and weather information when a weight is assigned to one of the accumulated related information; and
         considering the predicted life of the photovoltaic device as a period that the failure probability is highest among the plurality of failure probabilities of the plurality of periods when the weight is not assigned to any one of the accumulated related information;
      controls the transceiver to transmit the determined predicted life to the external device; and
      controls the transceiver to transmit a control signal to store an operation of the photovoltaic device to the photovoltaic device when it is determined that it is difficult to operate the photovoltaic device longer than the determined predicted life.

2. The data collection device according to claim 1, wherein the reception unit receives, from the external device, a generation control signal and inspection cycle information for the photovoltaic device.

3. The data collection device according to claim 1, wherein the control unit transmits, to the photovoltaic device and the external device, a control signal to stop an operation of the photovoltaic device based on the determined predicted life.

4. The data collection device according to claim 1, further comprising a display that displays a response received from the external device.

5. A photovoltaic system using solar energy, the photovoltaic system comprising:
   an external device;
   a photovoltaic device configured to absorb and convert solar energy into electrical energy; and
   a data collection device configured to store accumulated related information related to the photovoltaic device, receive, from the photovoltaic device, photovoltaic power generation data and photovoltaic power generation related information, and determine a predicted life of the photovoltaic device based on the photovoltaic power generation related information received from a reception unit and the accumulated related information,
wherein the photovoltaic power generation related information comprises at least one of a use period, failure history, accumulated generation, weather information, and installation position of the photovoltaic device, and the stored accumulated related information comprises at least one of a use period, failure history, accumulated generation, weather information, and installation position of a different photovoltaic device corresponding to the photovoltaic device,
wherein the data collection device is configured to:
compare at least one of the use period, failure history, accumulated generation, and weather information that are received through the reception unit, with at least one of the use period, failure history, accumulated generation, and weather information that are stored in a storage;
calculate a failure probability of the photovoltaic device for each of a plurality of periods based on a result of the comparison;
determine the predicted life of the photovoltaic device by:
considering the predicted life of the photovoltaic device as a failure probability of the photovoltaic device calculated with regard to one of the use period, failure history, accumulated generation, and weather information when a weight is assigned to one of the accumulated related information; and
considering the predicted life of the photovoltaic device as a period that the failure probability is highest among the plurality of failure probabilities of the plurality of periods when the weight is not assigned to any one of the accumulated related information;
transmit the determined predicted life to the external device; and
transmit a control signal to store an operation of the photovoltaic device to the photovoltaic device when it is determined that it is difficult to operate the photovoltaic device longer than the determined predicted life.

6. The photovoltaic system according to claim 5, wherein the external device transmits, to the data collection device, a generation control signal and inspection cycle information for the photovoltaic device based on the predicted life of the photovoltaic device that is received from the data collection device.

7. The photovoltaic system according to claim 6, wherein the external device transmits a control signal to lower generation to the data collection device when the predicted life is shorter than an average life of the photovoltaic device of a same model.

8. The photovoltaic system according to claim 6, wherein the data collection device transmits, to the photovoltaic device and the external device, a control signal to stop an operation of the photovoltaic device based on the determined predicted life.

9. The photovoltaic system according to claim 6, wherein the data collection device outputs a response received from the external device.

* * * * *